(12) United States Patent
Chae et al.

(10) Patent No.: US 12,380,716 B2
(45) Date of Patent: Aug. 5, 2025

(54) CHARACTER RECOGNITION DEVICE, METHOD, AND NON-TRANSITORY COMPUTER READABLE STORAGE MEDIUM

(71) Applicant: RAKUTEN GROUP, INC., Tokyo (JP)

(72) Inventors: Yeongnam Chae, Tokyo (JP); Preetham Prakasha, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 388 days.

(21) Appl. No.: 17/697,963

(22) Filed: Mar. 18, 2022

(65) Prior Publication Data
US 2022/0301325 A1    Sep. 22, 2022

(30) Foreign Application Priority Data
Mar. 22, 2021  (JP) ................... 2021-047871

(51) Int. Cl.
*G06V 30/10*    (2022.01)
*G06T 7/70*    (2017.01)
*G06V 10/764*    (2022.01)

(52) U.S. Cl.
CPC .............. *G06V 30/10* (2022.01); *G06T 7/70* (2017.01); *G06V 10/764* (2022.01)

(58) Field of Classification Search
None
See application file for complete search history.

(56) References Cited

U.S. PATENT DOCUMENTS 5,321,768 A * 6/1994 Fenrich ................ G06V 30/148
                                                              382/179
5,594,809 A * 1/1997 Kopec ................... G06F 18/295
                                                              382/161

(Continued)

FOREIGN PATENT DOCUMENTS

JP       S61196381 A    8/1986
JP       2007206985 A   8/2007

(Continued)

OTHER PUBLICATIONS

Baek et al., "Character Region Awareness for Text Detection," arXiv:1904.01941v1 [cs.CV] Apr. 3, 2019 (Year: 2019).*

(Continued)

*Primary Examiner* — Soo Shin
(74) *Attorney, Agent, or Firm* — HEA Law PLLC

(57) ABSTRACT

The information processing device acquires a probability image representing a probability of an existence of a character in each of pixels included in a target image including a plurality of characters based on the target image, estimates positions of respective character images included in the target image based on the acquired probability image, classifies the plurality of character images into a plurality of groups based on the estimated positions, acquires a plurality of recognition target images which is generated so as to correspond to the plurality of groups, and includes the plurality of character images respectively belonging to the corresponding groups, and recognizes the plurality of characters from each of the recognition target images.

10 Claims, 8 Drawing Sheets

(56) References Cited

U.S. PATENT DOCUMENTS

| | | | | |
|---|---|---|---|---|
| 5,883,986 | A * | 3/1999 | Kopec | G06V 30/262 382/230 |
| 6,115,498 | A * | 9/2000 | Ro | G06T 11/001 382/199 |
| 6,738,518 | B1 * | 5/2004 | Minka | G06V 30/262 382/218 |
| 8,005,294 | B2 * | 8/2011 | Kundu | G06V 30/2268 382/186 |
| 8,326,037 | B1 * | 12/2012 | Abitz | G06K 7/1443 382/101 |
| 12,087,067 | B2 * | 9/2024 | Chae | G06V 30/153 |
| 12,101,449 | B2 * | 9/2024 | Fujitani | G06F 16/93 |
| 2004/0071345 | A1 | 4/2004 | Hashimoto et al. | |
| 2010/0008581 | A1 * | 1/2010 | Bressan | G06V 30/2264 382/177 |
| 2011/0123114 | A1 * | 5/2011 | Hwang | G06V 30/414 382/176 |
| 2011/0243445 | A1 * | 10/2011 | Uzelac | G06V 30/15 382/177 |
| 2011/0280477 | A1 * | 11/2011 | Al-Omari | G06V 30/15 382/165 |
| 2013/0028524 | A1 * | 1/2013 | Kondo | G06V 30/18086 382/199 |
| 2013/0077856 | A1 * | 3/2013 | Ferro | G06T 7/0004 382/159 |
| 2018/0053048 | A1 | 2/2018 | Zhou et al. | |
| 2018/0089525 | A1 | 3/2018 | Yang | |
| 2019/0272438 | A1 * | 9/2019 | Liu | G06N 3/045 |

FOREIGN PATENT DOCUMENTS

| | | |
|---|---|---|
| JP | 2010191724 A | 9/2010 |
| JP | 2018519574 A | 7/2018 |
| KR | 1020160146355 | 12/2016 |

OTHER PUBLICATIONS

Baek, Youngmin, et al., "Character region awareness for text detection.", Proceedings of the IEEE Conference on Computer Vision and Pattern Recognition, Apr. 3, 2019, pp. 1-12. (Cited in the specification on p. 2, lines 7-11).

Liu, W., Chen, C., Wong, K.-Y. K., Su, Z., & Han, J., "Star-net: A spatialattention residue network for scene text recognition", In BMVC, 2016 (vol. 2, p. 7), pp. 1-13. (Cited in the specification on p. 2, lines 12-16).

Office Action of Apr. 12, 2022, for related JP Patent Application No. 2021-047872 with partial English translation pp. 1-13.

Office Action of Jan. 10, 2023, for corresponding JP Patent Application No. 2021-0478711 translation, pp. 1-10.

Baek Youngmin et al. "Character Region Attention for Text Spotting: 16th European Conference, Glasgow, UK, Aug. 23-28, 2020 Proceedings, Part XXIX" In: "Pattern Recognition: 5th Asian Conference, ACPR 2019, Auckland, NZ, Nov. 26-29, 2019, Revised Selected Papers, Part II", Jan. 1, 2020, Springer International Publishing, Cham, XP055944740, ISSN: 0302-9743 ISBN: 978-3-030-41298-2 vol. 12374, pp. 504-521, DOI:10.1007/978-3-030-58526-6_30, Retrieved from the internet: URL:https://link.springer.com/content/pdf/10.1007/978-3-030-58526-6_30.pdf.

Search Report of Aug. 1, 2022, for corresponding EP Patent Application No. 22163194.8, pp. 1-11.

Search Report of Aug. 1, 2022, for corresponding EP Patent Application No. 22163197.1, pp. 1-9.

Office Action of Nov. 28, 2023, for related U.S. Appl. No. 17/697,954, pp. 1-22.

Office Action of Jun. 2, 2023, for related U.S. Appl. No. 17/697,954, pp. 1-36.

Office Action of Apr. 19, 2022, for corresponding JP Patent Application No. 2021-047871 with partial English translation pp. 1-6.

* cited by examiner

CHARACTER RECOGNITION DEVICE, METHOD, AND NON-TRANSITORY COMPUTER READABLE STORAGE MEDIUM

CROSS-REFERENCE TO RELATED APPLICATION

The present application claims priority from Japanese application JP2021-047871 filed on Mar. 22, 2021, the content of which is hereby incorporated by reference into this application.

BACKGROUND OF THE INVENTION

1. Field of the Invention

The invention relates to an information processing device, an information processing method, and a non-transitory computer readable storage medium.

2. Description of the Related Art

There exists a technology of recognizing, from an image including a character string, the character string in which description method of the character string is not strictly determined, and the technology is called Scene Text Recognition.

In a part of a method of Scene Text Recognition, before performing processing of recognizing a character itself, there is performed processing of recognizing a region where a word or the character exists. As one of methods of recognizing this region, there is proposed Character Region Awareness for Text Detection (CRAFT). In the CRAFT, a model to which an image is input outputs a probability image representing a probability of existence of characters and a probability image representing a probability of being a space between the characters. Based on the probability images, a region to be a target of the character recognition is clipped, and the processing of the character recognition is performed.

In Document 1 (Baek, Youngmin, et al., "Character region awareness for text detection." Proceedings of the IEEE Conference on Computer Vision and Pattern Recognition, 2019), there is disclosed the fact that a region where a word or a character exits is recognized based on the probability images.

In Document 2 (Liu, W., Chen, C., Wong, K.-Y. K., Su, Z., & Han, J., Star-net: A spatial attention residue network for scene text recognition, In BMVC (Vol. 2, p. 7)), there is disclosed a technology of recognizing a character string existing in an image using a neural network.

The inventors are under study for a method of causing the model to output the character probability from the input image including the character, clipping the character string region in which the character string exists using the character probability, and then taking the character string region thus clipped as the target of the character recognition. It is preferable for the character string region to include the characters as much as a number in a range of, for example, four through seven. Here, the recognition accuracy is reduced due to the clipping of the character string region in some cases.

SUMMARY OF THE INVENTION

The invention is made in view of the problem described above, and an object thereof is to provide a technology of increasing the accuracy of the recognition of a character included in an image.

In view of the problems described above, an information processing device according to the invention includes probability image acquisition means for acquiring a probability image representing a probability of an existence of a character in each of pixels included in a target image including a plurality of characters based on the target image, estimation means for estimating positions of respective character images included in the target image based on the acquired probability image, clustering means for classifying the plurality of character images into a plurality of groups based on the estimated positions, recognition target image acquisition means for acquiring a plurality of recognition target images which is generated so as to correspond to the plurality of groups, and includes the plurality of character images respectively belonging to the corresponding groups, and character recognition means for recognizing the plurality of characters from each of the recognition target images.

Further, an information processing method according to the invention includes the steps of acquiring a probability image representing a probability of an existence of a character in each of pixels included in a target image including a plurality of characters based on the target image, estimating positions of respective character images included in the target image based on the acquired probability image, classifying the plurality of character images into a plurality of groups based on the estimated positions, acquiring a plurality of recognition target images which is generated so as to correspond to the plurality of groups, and includes the plurality of character images respectively belonging to the corresponding groups, and recognizing the plurality of characters from each of the recognition target images.

Further, a program according to the invention makes a computer function as an apparatus including probability image acquisition means for acquiring a probability image representing a probability of an existence of a character in each of pixels included in a target image including a plurality of characters based on the target image, estimation means for estimating positions of respective character images included in the target image based on the acquired probability image, clustering means for classifying the plurality of character images into a plurality of groups based on the estimated positions, recognition target image acquisition means for acquiring a plurality of recognition target images which is generated so as to correspond to the plurality of groups, and includes the plurality of character images respectively belonging to the corresponding groups, and character recognition means for recognizing the plurality of characters from each of the recognition target images.

In the aspect of the invention, the estimation means can obtain central coordinates of the respective character images included in the target image as the positions based on the acquired probability image.

In the aspect of the invention, it is possible to obtain components in a specific direction of central coordinates of the respective character images included in the target image as the positions based on the acquired probability image.

In the aspect of the invention, it is possible for the information processing device to further include character string output means for outputting a connected character string obtained by connecting recognized character strings each formed of a plurality of characters recognized from each of the recognition target images.

According to the invention, it is possible to increase the recognition accuracy of a character included in an image.

DETAILED DESCRIPTION OF THE INVENTION

An embodiment of the invention will hereinafter be described based on the drawings. With respect to the constituents denoted by the same symbol, redundant descriptions will be omitted. In the present embodiment, the description will be presented citing the case of recognizing a character string described in a license from a photographed image of the license as an example.

Figure 1:
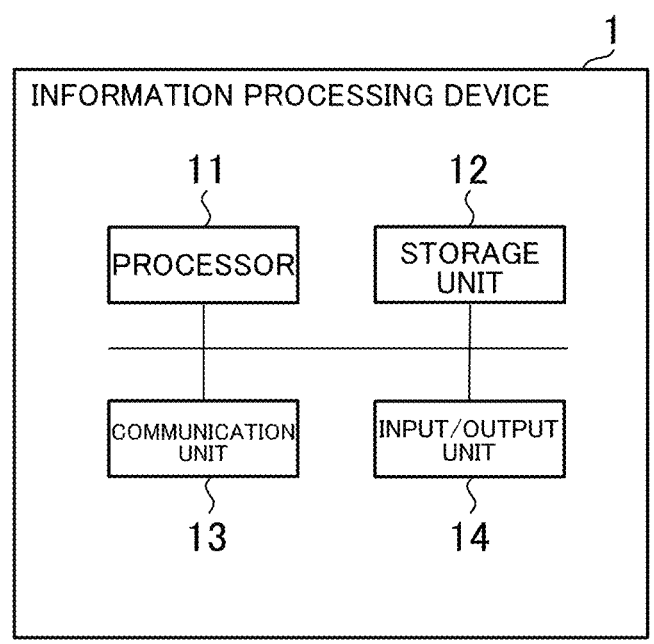
FIG. 1 is a diagram showing an example of an information processing device according to an embodiment of the invention.

FIG. 1 is a diagram showing an example of an information processing device according to the embodiment of the invention.

The information processing device 1 includes a processor 11, a storage unit 12, a communication unit 13, and an input/output unit 14. The information processing device 1 is a server computer or a personal computer. The processing of the information processing device 1 can be implemented by a plurality of server computers.

The processor 11 operates in accordance with a program stored in the storage unit 12. Further, the processor 11 controls the communication unit 13 and the input/output unit 14. It should be noted that the program described above can be provided via the Internet or the like, or via a computer-readable storage medium such as a flash memory or a DVD-ROM in which the program is stored.

The storage unit 12 is constituted by a memory element such as a RAM and a flash memory, and an external storage device such as a hard disk drive. The storage unit 12 stores the program described above. Further, the storage unit 12 stores the information and the calculation result input from the processor 11, the communication unit 13, and the input/output unit 14.

The communication unit 13 is implemented for a function of communicating with other devices, and is constituted of, for example, an integrated circuit for realizing a wireless LAN and a wired LAN. Based on the control by the processor 11, the communication unit 13 inputs the information received from other devices to the processor 11 and the storage unit 12, and transmits information to other devices.

The input/output unit 14 is constituted of a video controller for controlling a display output device, a controller for obtaining data from an input device, and so on. As the input device, there can be cited a keyboard, a mouse, a touch panel, and so on. Based on the control by the processor 11, the input/output unit 14 outputs display data to the display output device, and obtains the data input by the user operating the input device. The display output device is, for example, a display device to be connected to the outside.

Figure 2:
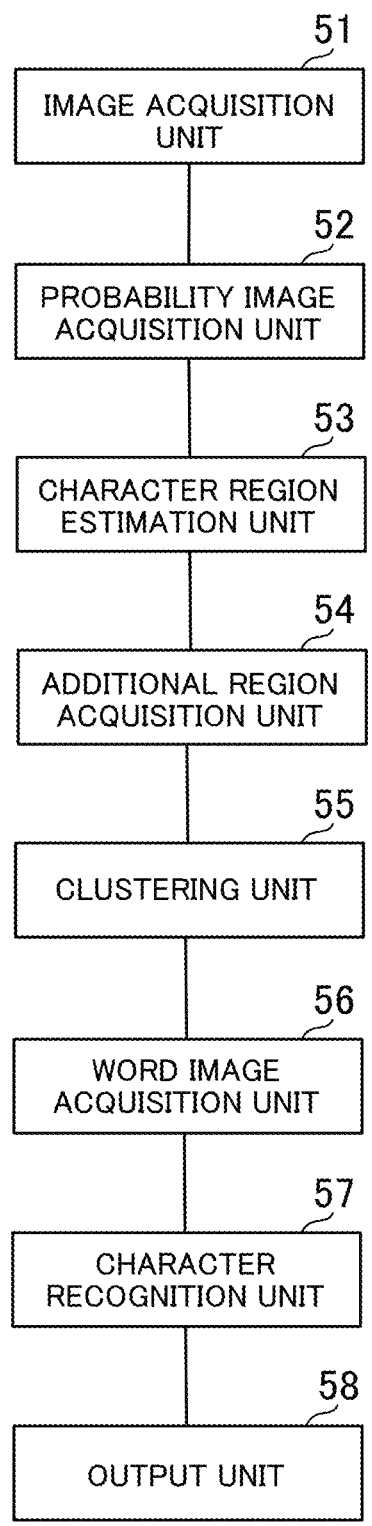
FIG. 2 is a block diagram showing functions implemented by the information processing device.

Then, functions provided by the information processing device 1 will be described. FIG. 2 is a block diagram showing the functions implemented by the information processing device 1. The information processing device 1 functionally includes an image acquisition unit 51, a probability image acquisition unit 52, a character region estimation unit 53, an additional region acquisition unit 54, a clustering unit 55, a word image acquisition unit 56, a character recognition unit 57, and an output unit 58. These functions are realized by the processor 11 included in the information processing device 1 executing the program stored in the storage unit 12 to control the communication unit 13 and so on.

The image acquisition unit 51 obtains an input image 70 which is taken by the user, and includes a character string which consists of a plurality of characters. The image acquisition unit 51 may obtain the input image 70 from the computer operated by the user via the communication unit 13, and may obtain the input image 70 stored in advance in the storage unit 12. Further, the image acquisition unit 51 obtains, from the input image 70, a processing target image 71 to be a target of the processing related to the character string recognition to subsequently be performed.

Figure 3:
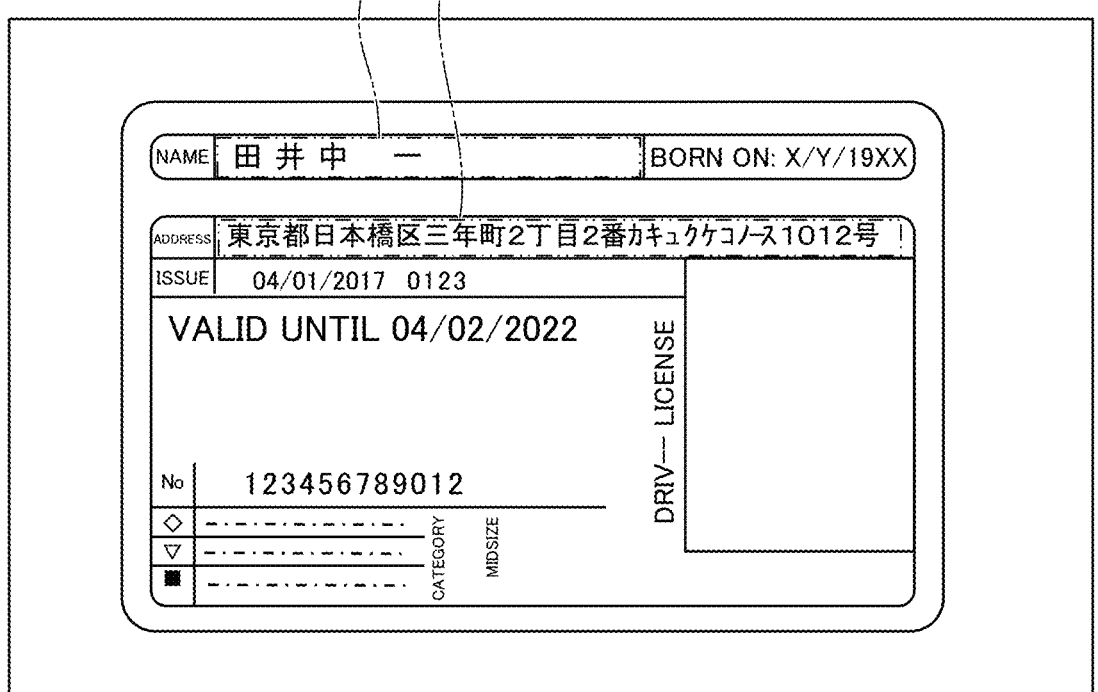
FIG. 3 is a diagram showing an example of an input image and a processing target image.

FIG. 3 is a diagram showing an example of the input image 70 and the processing target image 71. In the example shown in FIG. 3, the input image 70 includes an image of a license shot by the user, and the input image 70 includes an image of a plurality of characters described in the license. When the input image 70 is tilted, or a document such as a license showing in the input image 70 is distorted (e.g., the document becomes to have a trapezoidal shape), the image acquisition unit 51 corrects the orientation and the shape of the input image 70. Further, in the example shown in FIG. 3, the processing target images 71a, 71b are extracted from the input image 70. The processing target image 71 includes a plurality of characters arranged in an arrangement direction. The input image 70 and the processing target image 71 each include a plurality of pixels. The plurality of pixels can be arranged in a matrix.

As shown in FIG. 3, when a region where a character which should be recognized exists on the document can be recognized with a logic, the image acquisition unit 51 identifies a region which should be the target of the recognition processing from the input image 70, and then extracts the processing target image 71 having the identified region.

It should be noted that since the arrangement of the characters (in particular, the intervals) inside the processing target image 71 is not necessarily uniform in the example shown in FIG. 3, and it is necessary to make an adjustment to a variation in the positions of the characters in the character recognition processing. Further, the whole of the input image 70 may be identified as the processing target image 71 without performing the processing of the extraction.

The probability image acquisition unit 52 obtains the probability image 72 representing the probability of the existence of the character in each of the pixels included in the processing target image 71 based on the processing target image 71 including the plurality of characters.

Figure 4:
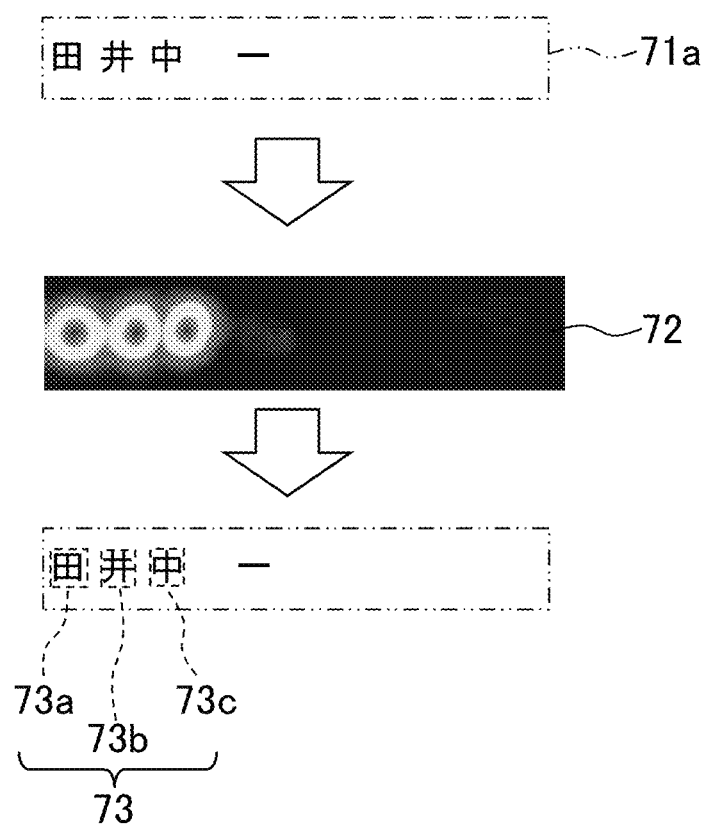
FIG. 4 is a diagram showing an example of a processing target image, a probability image, and a character region.

FIG. 4 is a diagram showing an example of the processing target image 71, the probability image 72, and a character region 73. In FIG. 4, there are described a processing target image 71a, the probability image 72 obtained from the processing target image 71a, and character regions 73a, 73b, and 73c estimated from the probability image 72.

The character region estimation unit 53 estimates positions of the plurality of character regions 73 included in the processing target image 71 based on the obtained probability image 72. Each of the images in the respective character regions 73 is estimated to include a single character. More specifically, the character region estimation unit 53 obtains the positions and the shapes of the plurality of character regions 73 in the processing target image 71. A character is estimated to exist in each of the plurality of character regions 73.

In the processing target image 71, based on a determination result on whether or not there exists a pixel of a non-background color in a direction perpendicular to the arrangement direction at every position on the arrangement direction, the additional region acquisition unit 54 obtains an additional character region 74 (see FIG. 7) in the processing target image 71. The additional character region 74 does not overlap the plurality of character regions 73 which has already been estimated.

The clustering unit 55 classifies the plurality of character regions 73 into a plurality of groups based on the estimated positions.

The word image acquisition unit 56 obtains a plurality of word images 76 (see FIG. 8) which is generated in accordance with the plurality of groups, and each of which includes a plurality of character regions 73 belonging respectively to the corresponding groups.

The character recognition unit 57 recognizes a plurality of characters (a recognition character string) from the respective word images 76.

The output unit 58 outputs a connected character string having the recognition character strings connected to one another. The connected character strings which are output can be used for processing by other programs such as a program of identifying the user by comparing information input by the user.

Figure 5:
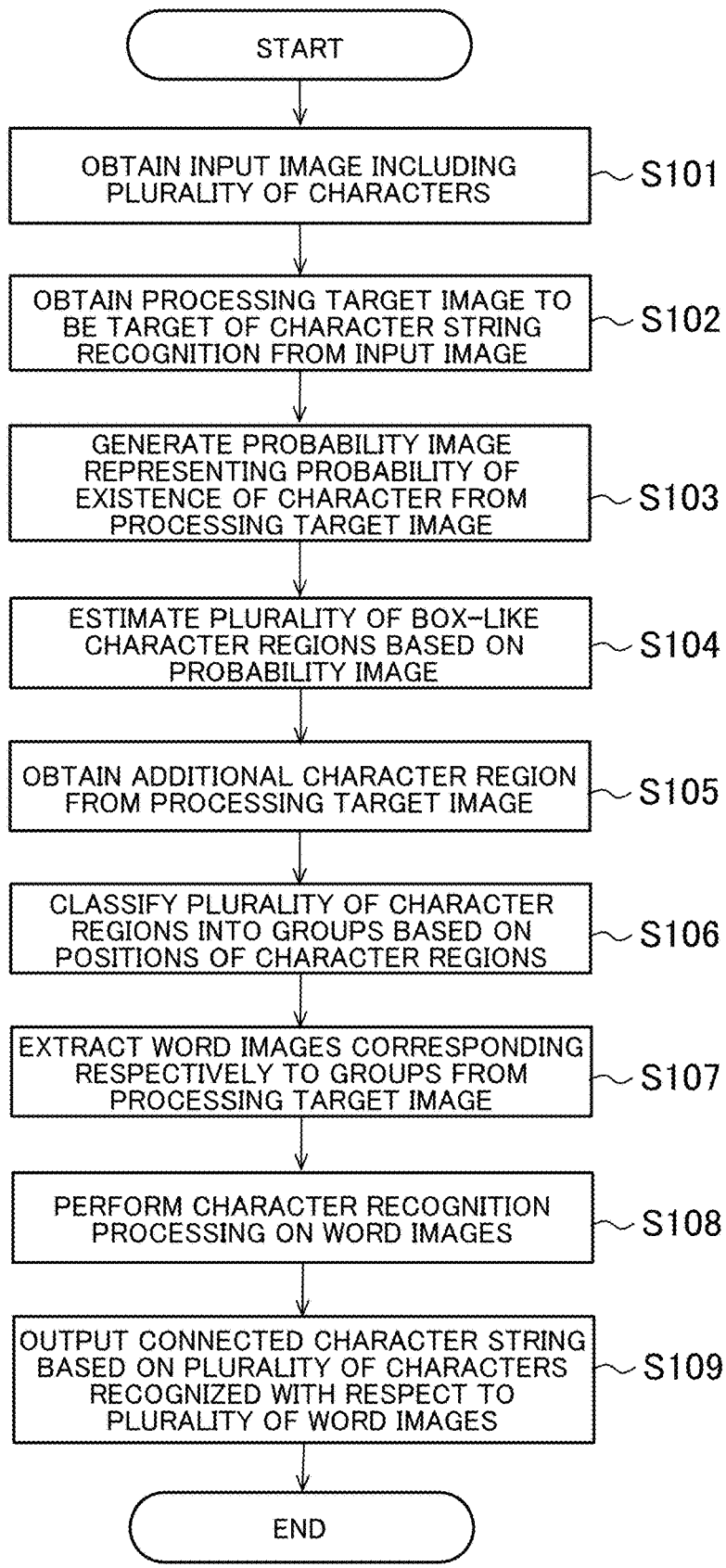
FIG. 5 is a flowchart showing an example of processing to be executed by the information processing device.

Then, the details of the processing of the information processing system will be described. FIG. 5 is a flowchart showing an example of the processing to be executed by the information processing device 1.

First, the image acquisition unit 51 obtains the input image including a plurality of images of characters (step S101). Then, the image acquisition unit 51 obtains, from the input image, the processing target image to be a target of the character string recognition (step S102). More specifically, in the step S102, the image acquisition unit 51 identifies a region which should be the target of the recognition processing based on a position and a size of the document in the input image 70, and a line for zoning the region of the document, and then extracts the processing target image 71 having the identified region. Between the step S101 and the step S102, the image acquisition unit 51 may perform the processing of correcting the orientation and the shape of the input image 70. Further, in the step S102, the image acquisition unit 51 may decide the input image directly as the processing target image.

When the processing target image 71 is obtained, the probability image acquisition unit 52 generates the probability image 72 representing the probability of the existence of the character from the processing target image 71 (step S103). The probability image 72 includes a Region Score image and an Affinity Score image. Each of pixels in the Region Score image represents a probability of existence of the center of the character at the position thereof, and each of pixels of the Affinity Score image represents a probability of existence of the center of a space between characters adjacent to each other at the position thereof.

The probability image acquisition unit 52 inputs the processing target image 71 to a machine learning model trained by the CRAFT shown in Document 1, and obtains the output of the machine learning model as the Region Score image and the Affinity Score image. The machine learning model is trained by a learning image including a character image, and ground truth data including the Region Score image and the Affinity Score image corresponding to the learning image. The Region Score image included in the ground truth data may be generated by, for example, performing a projective transformation of a Gaussian distribution on a rectangular region of a character in a learning image, and the Affinity Score image included in the training data may be generated by, for example, generating a rectangular region centering on a space between characters in the learning image, and then performing the projective transformation of the Gaussian distribution on the rectangular region. Further, as described in Document 1, the Region Score image and the Affinity Score image for the ground truth data may be generated by generating, using the machine learning model, a tentative Region Score image from a word region included in an actual learning image, performing the projective transformation of the Gaussian distribution on the rectangular regions of the characters obtained by dividing the word region and the rectangular region centering on the space between the characters using the tentative Region Score image, and arranging, the images including the Gaussian distribution obtained by the projective transformation in a region corresponding to the word region of the learning image in the Region Score image or the Affinity Score image.

The character region estimation unit 53 estimates the plurality of character regions 73 each having a box-like shape based on the probability image 72 (step S104). As is understood from FIG. 4, the shape of the character region 73 is a quadrangle having two sides extending in the arrangement direction of the characters and two sides extending in a direction perpendicular thereto. The character region estimation unit 53 estimates the character regions 73 based on the distribution of the values in the Region Score image of the probability image 72. Specifically, the character region estimation unit 53 may calculate the positions and the shapes of the character regions 73 based on regions obtained by applying a watershed algorithm to the probability image 72.

When the character regions 73 have estimated, the additional region acquisition unit 54 obtains the additional character region 74 from the processing target image 71 (step S105). More specifically, in the processing target image 71, based on the determination result on whether or not there exists a pixel of a non-background color in the direction perpendicular to the arrangement direction at every position on the arrangement direction, the additional region acquisition unit 54 obtains the additional character region 74 which does not overlap the plurality of character regions 73 which has already been estimated.

Figure 6:
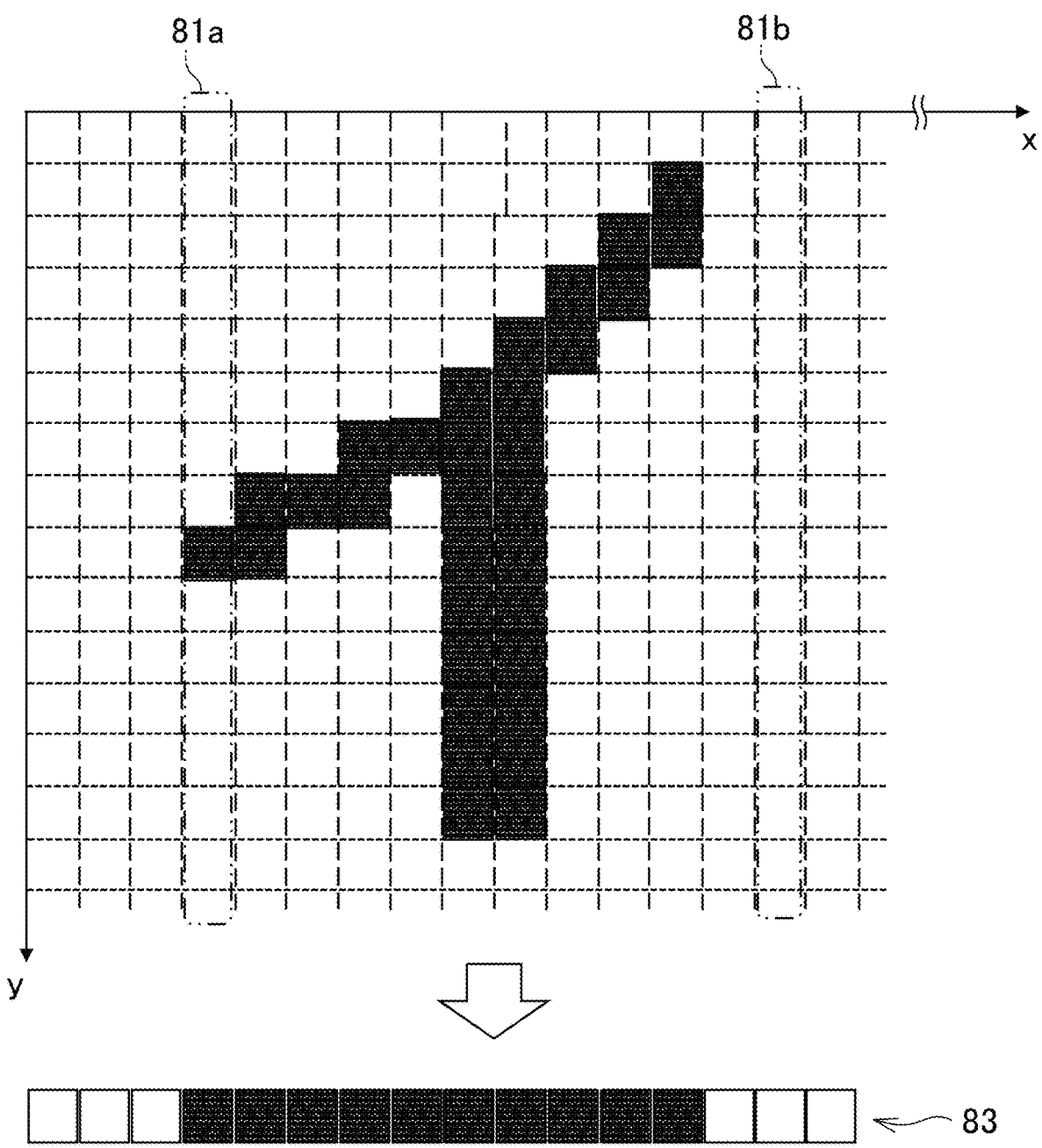
FIG. 6 is a diagram schematically showing an example of pixels constituting the processing target image and a determination result.

The processing of the additional region acquisition unit 54 will further be described. FIG. 6 is a diagram schematically showing an example of the pixels constituting the processing target image 71 and the determination result. In an upper part of FIG. 6, there are described the pixels constituting a part of the processing target image 71 together with the coordinate axes. In this example, a part corresponding to one character of the processing target image 71 is schematically shown. In the diagram in the upper part of FIG. 6, white rectangular regions surrounded mainly by dotted lines represent the pixels of the background color, and black rectangular regions represent the pixels of a non-background color. For example, the additional region acquisition unit 54 select, among a first color higher in luminance than a predetermined threshold value, and a second color as a color no higher in the luminance than the predetermined threshold value, one smaller in number of pixels as the non-background color. The luminance may be taken by converting the pixels into the grayscale.

Further, although not clearly shown in FIG. 6, it is assumed that the characters included in the processing target image 71 are arranged in an x-axis direction. Hereinafter, in the processing target image 71, a column of the pixels arranged in a direction (a y-axis direction) perpendicular to the arrangement direction is called a pixel column 81. In FIG. 6, a pixel column 81a includes the pixel of the non-background color, but a pixel column 81b does not include the pixel of the non-background color.

The additional region acquisition unit 54 determines whether or not each of the pixel columns 81 is a candidate column including the pixel of the non-background color in the processing target image 71. The additional region acquisition unit 54 may set a value of 0 to the pixel of the background color of the processing target image 71, and a value of 1 to the pixel of the non-background color, and obtain a logical OR of the values of the plurality of pixels included in the pixel column 81 to thereby determine whether the pixel column 81 is the candidate column. In this case, the pixel column 81 in which the logical OR has the value 1 is the candidate column.

At a lower side of the arrow in FIG. 6, there is described the determination result, and each of the rectangular regions represents the determination result of the pixel column 81 located above the rectangular region. The rectangular region represented by black represents that the logical OR with respect to the pixel column 81 located above the rectangular region in FIG. 6 is 1, and thus, the pixel column 81 is the candidate column. In contrast, the rectangular region represented by white represents that the logical OR with respect to the pixel column 81 located above the rectangular region is 0, and thus, the pixel column 81 is not the candidate column. As is understood from FIG. 6, the determination result can be obtained by the logical OR corresponding to squeezing the processing target image in the direction perpendicular to the arrangement direction. Expression of the determination result by those like pixels arranged in the x-axis direction is hereinafter described as a post-compression expression 83.

After the determination on the candidate column, the additional region acquisition unit 54 obtains, as the additional character region 74, a region which corresponds to a range in which the candidate columns continuously exist in the processing target image 71, and which does not overlap the plurality of character regions 73 estimated by the character region estimation unit 53. More specifically, when the number of the candidate columns continuously arranged exceeds a determination threshold value, the additional region acquisition unit 54 determines whether or not there is the character region 73 having already been estimated in the region where those candidate columns exist. Then, when there is not the character region 73 in that region, the additional region acquisition unit 54 obtains the region where the candidate columns continuously arranged exist as the additional character region 74. It should be noted that the additional region acquisition unit 54 may obtain a region including the vicinity of the region in which the candidate columns continuously arranged as the additional character region 74. Naturally, when all of the regions in which the candidate columns continuously arranged exist overlap the character regions 73 having already been estimated, no additional character region 74 is obtained.

Figure 7:
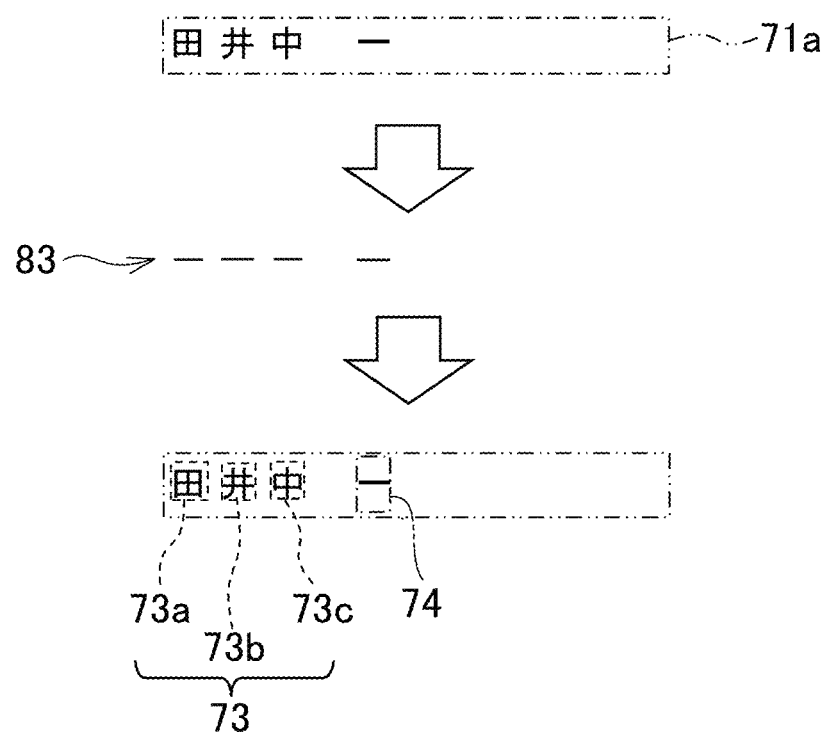
FIG. 7 is a diagram showing an example of the processing target image, the determination result, and an additional character region.

FIG. 7 is a diagram showing an example of the processing target image 71, the post-compression expression 83 representing the determination result, and the additional character region 74. In the example shown in FIG. 7, there are described the processing target image 71a, the post-compression expression 83 representing the determination result obtained from the processing target image 71a, and the additional character region 74 obtained from the determination result. In the example shown in FIG. 7, there are the regions where the candidate columns the number of which exceeds the determination threshold value are arranged in each of the three characters located in the left part, but the regions overlap the character region 73a, 73b, or 73c having already been estimated, and therefore, no additional character region 74 is obtained.

In the model using such a neural network as described in Document 1, a character constituted by a small number of lines extending in a lateral direction, for example, is assumed as a wrinkle or the like in the background and fails to be recognized as a character in some cases when a next character is not adjacent thereto. Due to the processing of the additional region acquisition unit 54, it is possible to reduce a failure of the acquisition of the region to be the target of the character recognition processing to subsequently be performed.

The arrangement direction of the characters is set to the x-axis direction in the example shown in FIG. 6, but can be the y-axis direction. Further, by performing the processing of determination assuming, as the candidate column, the pixels arranged in a direction perpendicular to the arrangement direction when viewed from an arbitrary point on a line extending in the arrangement direction, it is possible to perform the processing even in the arrangement direction other than the x axis or the y axis. It should be noted that it is not required to perform the processing of the additional region acquisition unit 54 although the recognition accuracy is reduced.

In the subsequent processing, the processing is performed on the condition that the character region 73 and the additional character region 74 are the same in type. Naturally, when no additional character region 74 exists, it is possible to perform the processing only on the plurality of character regions 73. Hereinafter, it is assumed that when describing "character region 73 and so on," the character region 73 and the additional character region 74 are represented when the additional character region 74 exists, or only the character region 73 is represented when no additional character region 74 exists.

When the processing in the step S105 is performed, the clustering unit 55 classifies the character regions 73 and so on into groups based on the estimated positions of the character regions 73 and so on (step S106). More specifically, the character regions 73 and so on are classified into the groups using such a clustering method as a k-means method based on the coordinates of the character regions 73 and so on. The values of the positions to be the target of the clustering are components in the arrangement direction of the center positions of the character regions 73 and so on, and can more specifically be x-coordinates of the centers of the character regions 73 and so on. The coordinates to be the target of the clustering can be y-coordinates when the character regions 73 are arranged in a vertical direction.

When the character regions 73 and so on are classified into the groups, the word image acquisition unit 56 extracts a plurality of word images 76 corresponding respectively to the plurality of classified groups (step S107). Each of the word images 76 includes images of the character regions 73 and so on belonging to the corresponding group. For example, the word image acquisition unit 56 obtains, as the word image 76, a region surrounded by lines which are obtained by extending a side at a head side of the character region 73 located at the head, a side at a tail side of the character region 73 located at the tail, a side the farthest in one side in a direction perpendicular to the arrangement direction in all of the character regions 73, and a side the farthest in an opposite side. The word image 76 includes the images of the character regions 73 and so on belonging to the corresponding group.

Figure 8:
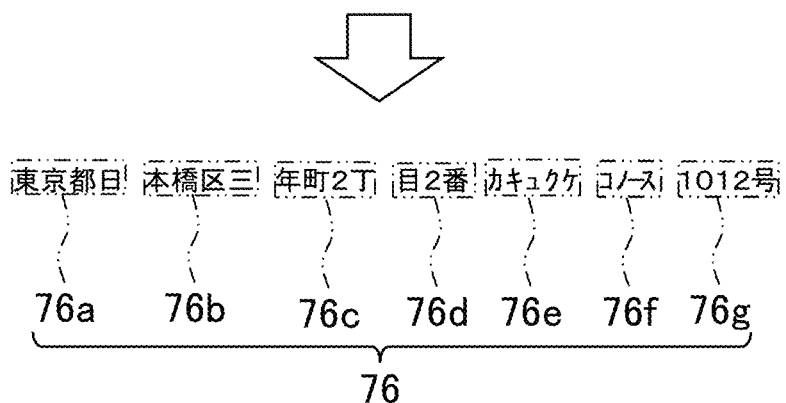
FIG. 8 is a diagram showing an example of the processing target image and a word image.

FIG. 8 is a diagram showing an example of the processing target image 71b and the word image 76. In the example shown in FIG. 8, seven word images 76a, 76b, 76c, 76d, 76e, 76f, and 76g are extracted from the processing target image 71b. As is understood from FIG. 8, the word image 76 is never determined simply by the number of characters, and when a one-byte character and a double-byte character are mixed, the word images 76e, 76f including only the one-byte characters and the word images 76d including only the double-byte characters are apt to be separated from each other.

It is known that when the one-byte character and the double-byte character are mixed, an error in the character recognition is apt to occur. Due to the extraction of the word images using the clustering, it becomes possible to reduce the error caused by the mixture. Further, the number of characters suitable for the character recognition is about 4 through 7 depending on the recognition method. Due to the clustering, it is possible to prevent the number of characters included in the word image from becoming too small, and it is possible to easily make the number of characters suitable for the character recognition.

When the word images 76 are extracted, the character recognition unit 57 performs the character recognition processing on each of the word images 76 to recognize the plurality of characters from each of the word images 76 (step S107). Here, the plurality of characters recognized for each of the word images 76 are described as a recognized character string.

The character recognition processing can be performed by a known method. For example, it can be performed based on STAR-Net described in Document 2. In the STAR-Net, there exist four steps, namely Transformation Stage, Feature extraction stage, Sequence modeling stage, and Prediction stage, and in the Transformation Stage, the shape of the region is transformed by Thin-plate spline. Further, a neural network such as ResNet, BiLS™, or CTC are used for the Feature extraction stage, the Sequence modeling stage, and the Prediction stage. Further, the type of the neural network to be used for the Feature extraction stage, the Sequence modeling stage, and the Prediction stage can be different from the STAR-Net described in Document 2. For example, the Prediction stage can be Attention-based. The machine learning model including the Feature extraction stage, the Sequence modeling stage, and the Prediction stage can be learned with the learning image which is input to the machine learning model, and includes the characters, and the ground truth data including the character string representing the plurality of characters included in the learning image. Further, in the present embodiment, the character recognition unit 57 may input the word image 76 to the machine learning model, and then obtain the recognized character string corresponding to the word image 76 as the output thereof.

The output unit 58 outputs the connected character string based on the plurality of characters having been recognized with respect to each of the word images 76 (step S109). The connected character string is the character string obtained by connecting the plurality of recognized character strings recognized from the plurality of word images 76 to each other.

The connected character string which are output is, for example, a character string obtained by connecting the character strings recognized from the word images 76a through 76g shown in FIG. 8, and in this case, corresponds to description content in the address field shown in FIG. 3. It is known that when the number of characters is large as in the address field, the time for the character recognition processing can be reduced by appropriately dividing the region. Due to the processing in the step S107 through the step S109, it becomes possible to increase the recognition accuracy while reducing the time taken for the character recognition.

Although the present embodiment is hereinabove described, the invention is not limited only to the above description. For example, the invention can easily be applied even to an image in which a plurality of characters is arranged along a curved line by appropriately correcting the image including the characters using an affine transformation or the like.

What is claimed is:

1. An information processing device comprising:
   at least one processor; and
   at least one memory device that stores a plurality of instructions which, when executed by the at least one processor, causes the at least one processor to:
   acquire a probability image representing a probability of an existence of a character in each pixel included in a target image including a plurality of characters based on the target image;
   estimate positions of respective character images included in the target image based on the acquired probability image;
   classify, by k-means method, the plurality of character images into a plurality of groups based on a component in an arrangement direction of the estimated position of each of the plurality of character images;
   acquire a plurality of recognition target images which is generated so as to correspond to the plurality of groups, and includes the plurality of character images respectively belonging to the corresponding groups;
   recognize the plurality of characters from each of the recognition target images;
   output a connected character string obtained by connecting recognized character strings each formed of a plurality of characters recognized from each of the recognition target images; and
   identify a user by comparing the connected character string to an information input by the user.

2. The information processing device according to claim 1, wherein
   components in a predetermined direction of central coordinates of the respective character images included in the target image are obtained as the positions based on the acquired probability image.

3. The information processing device according to claim 1, wherein each of the plurality of groups has a plurality of character regions.

4. The information processing device according to claim 1, wherein central coordinates of the respective character images included in the target image are obtained as the positions based on the acquired probability image.

5. The information processing device according to claim 4, wherein the arrangement direction is based on the central coordinates of the respective character images included in the target image.

6. The information processing device according to claim 1, wherein the plurality of instructions cause the at least one processor to acquire an additional character image after estimating the positions of the respective character images.

7. The information processing device according to claim 1, wherein the plurality of instructions cause the at least one processor to correct an orientation or a shape of the target image.

8. The information processing device according to claim 1, wherein the plurality of instructions cause the at least one processor to identify a region of the target image where a character should be.

9. An information processing method comprising:
- acquiring, with at least one processor operating with a memory device in a computer, a probability image representing a probability of an existence of a character in each pixel included in a target image including a plurality of characters based on the target image;
- estimating, with the at least one processor operating with the memory device in the computer, positions of respective character images included in the target image based on the acquired probability image;
- classifying, by k-means method, with the at least one processor operating with the memory device in the computer, the plurality of character images into a plurality of groups based on a component in an arrangement direction of the estimated position of each of the plurality of character images;
- acquiring, with the at least one processor operating with the memory device in the computer, a plurality of recognition target images which is generated so as to correspond to the plurality of groups, and includes the plurality of character images respectively belonging to the corresponding groups;
- recognizing, with the at least one processor operating with the memory device in the computer, the plurality of characters from each of the recognition target images;
- outputting a connected character string obtained by connecting recognized character strings each formed of a plurality of characters recognized from each of the recognition target images; and
- identifying a user by comparing the connected character string to an information input by the user.

10. A non-transitory computer readable storage medium storing a plurality of instructions, wherein when executed by at least one processor, the plurality of instructions cause the at least one processor to:
- acquire a probability image representing a probability of an existence of a character in each pixel included in a target image including a plurality of characters based on the target image;
- estimate positions of respective character images included in the target image based on the acquired probability image;
- classify, by k-means method, the plurality of character images into a plurality of groups based on a component in an arrangement direction of the estimated position of each of the plurality of character images;
- acquire a plurality of recognition target images which is generated so as to correspond to the plurality of groups, and includes the plurality of character images respectively belonging to the corresponding groups;
- recognize the plurality of characters from each of the recognition target images;
- output a connected character string obtained by connecting recognized character strings each formed of a plurality of characters recognized from each of the recognition target images; and
- identify a user by comparing the connected character string to an information input by the user.

* * * * *